US006980997B1

(12) United States Patent
Peschel-Gallee et al.

(10) Patent No.: US 6,980,997 B1
(45) Date of Patent: Dec. 27, 2005

(54) SYSTEM AND METHOD PROVIDING INLINED STUB

(75) Inventors: Frank V. Peschel-Gallee, Redmond, WA (US); Raja Krishnaswamy, Redmond, WA (US); Patrick H. Dussud, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 09/894,394

(22) Filed: Jun. 28, 2001

(51) Int. Cl.[7] ............................................. G06F 17/00
(52) U.S. Cl. .................... 707/103 Y; 717/165; 719/330
(58) Field of Search .......................... 707/206, 103 Y; 709/330; 717/167, 162, 165, 116, 108

(56) References Cited

U.S. PATENT DOCUMENTS

| | | | | |
|---|---|---|---|---|
| 5,491,800 | A | * | 2/1996 | Goldsmith et al. .......... 709/221 |
| 5,893,121 | A | * | 4/1999 | Ebrahim et al. ............ 707/206 |
| 6,067,580 | A | | 5/2000 | Aman et al. ................ 709/330 |
| 6,081,665 | A | * | 6/2000 | Nilsen et al. ............... 717/116 |
| 6,108,715 | A | * | 8/2000 | Leach et al. ................ 709/330 |
| 6,157,961 | A | * | 12/2000 | Kessler et al. .............. 709/315 |
| 6,393,497 | B1 | * | 5/2002 | Arnold et al. .............. 719/330 |
| 6,751,798 | B1 | * | 6/2004 | Schofield ..................... 719/330 |
| 2002/0091863 | A1 | * | 7/2002 | Schug ........................ 709/250 |

OTHER PUBLICATIONS

Bershad et al. "Lightweight Remote Procedure Call." ACM Transactions on Computer Systems (TOCS). vol. 8, No. 1, pp. 37-55. Feb. 1990. ACM Press.*

Wahbe et al. "Efficient Software-Based Fault Isolation." Proceedings of the Fourteenth ACM Symposium on Operating Systems Principles. vol. 27, No. 5, pp. 203-216. Dec. 1993. ACM Press.*

Dussud, P.H. "TICLOS: An Implementation of CLOS for the Explorer Family." Conference Proceedings on Object-Oriented Programming Systems, Languages and Applications. vol. 24, No. 10, pp. 215-219. Sep. 1989. ACM Press.*

* cited by examiner

Primary Examiner—Safet Metjahic
Assistant Examiner—Brian Goddard
(74) Attorney, Agent, or Firm—Amin & Turocy, LLP (57) ABSTRACT

A system and method is provided to facilitate communications between object systems. A caller is provided having optimized in-lined functionality when initiating a remote function call between managed and unmanaged object systems, for example. The in-lined functionality includes utilizing direct calls and returns within a calling function. In this manner, pushing additional arguments onto an execution stack because of an external stub reference is mitigated. In addition, one or more code loops can be analyzed to enable stack markers to be "hoisted" and thus pushed a single time instead of each time the calling function executes. Other aspects of the optimized caller provide garbage collection and thread management, security attribute checking on outgoing calls, calling convention considerations, wherein arguments and return values are organized according to the convention utilized by the remote object system, and in-lined marshalling to provide enhanced performance over external stub code references. Code extensibility options can be included enabling functions to be generalized thereby insulating object systems from implementation details of the called functions.

40 Claims, 9 Drawing Sheets

SYSTEM AND METHOD PROVIDING INLINED STUB

TECHNICAL FIELD

The present invention relates generally to computer systems, and more particularly to a system and method to enable communications between one or more (e.g., managed to unmanaged) object systems, including in-lined stub functionality employed to facilitate operational performance and communications between the object systems.

BACKGROUND OF THE INVENTION

As computer science has evolved, object oriented programming has become one of many familiar models designers and programmers utilize to implement functionality within computer systems. The object model generally is defined by a class structure that includes class members providing both methods and associated data elements belonging to the class. The class members thus provide/define desired functionality within a computer program, wherein an object is declared as an instance of a particular class. As is commonplace, objects often must exchange data and/or invoke other objects operating on the same platform and/or communicate with objects belonging to remote platforms. In order to communicate between objects, interface systems and standards have been developed to define how objects may communicate and/or interact with one another.

A familiar system for communicating and interfacing between objects is known as the Component Object Model (COM), wherein another similar system is referred to as the Common Object Request Brokers Architecture (CORBA). Still yet other communication interfaces may be defined in languages such as JAVA within an operating framework of a Java Virtual Machine, for example. As these and other systems have been developed however, two common object architectures or models generally have emerged and may generally be defined in terms of managed and unmanaged object systems, for example.

Managed objects may be allocated from a heap within a managed software environment and are generally not responsible for managing associated object lifetimes. Managed objects may be described in terms of a data type (e.g., metadata) and automatically collected (e.g., reclaimed) by a managed environment "garbage collector" that removes the object from memory when the object is no longer being accessed. In contrast, unmanaged objects may be allocated from a standard operating system heap, wherein the object itself is responsible for freeing memory it employs when references to the object no longer exist. This may be accomplished through well-known techniques such as reference counting, for example.

Managed applications and/or objects can execute calls to unmanaged Application Program Interfaces (APIs) (e.g., operating system APIs, entry points into dynamically loaded dynamic link libraries (DLLs), entry points into COM components) by a process called "platform invoke." In general, a call from managed to unmanaged code requires some additional code to be executed as part of a transition between the two execution models. For example, this may entail: potentially marshalling a plurality of arguments and return values (e.g., depending on the actual data-type, some data-types may not have similar representations in managed and unmanaged code); locating multiple markers on an execution stack (e.g., in order that a managed system can locate "managed" and "unmanaged" segments of the execution stack); considering thread execution on return from unmanaged to managed code; and potentially managing security issues between the execution environments.

In a general situation, this can be implemented by directing the call through an external interface referred to as "stub-code" that can perform these operations. Unfortunately, one or more of these stub-code operations are particularly time intensive (e.g., as compared to a regular call of a function in the same object system). For example, by utilizing a call through the stub, stack-based arguments often need to be copied onto a different stack location (i.e., the arguments need to be pushed again)—even if marshalling for the actual data-types is unnecessary. Another problem relates to adding markers on the stack and can involve an explicit update of a linked list, for example, such that access to the root of that list is comparatively expensive (e.g., processor execution cycles). Due to these and other issues relating to communications between object systems, there is a need for a system and methodology to facilitate improved execution performance when invoking functions and/or objects between object systems.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology that facilitates communications and execution performance between managed and unmanaged code environments. This is achieved by providing functional aspects and considerations of an in-lined stub having portions thereof incorporated within the execution framework of a calling function between managed and unmanaged code—in lieu of calling an external interface stub at run time. In this manner, copying and/or re-pushing of outgoing functional arguments onto an execution stack are mitigated. Moreover, adding a stack marker, for example, to an explicit list of stack markers can be hoisted (e.g., separated from an actual call). Thus, in the case of multiple calls, the list can be updated a single time instead of providing an update to the list each time for respective call sites. In addition, the in-lined stub mitigates the need to marshal outgoing call arguments and return values, and reduces the need for runtime security checking between the managed and unmanaged environments.

In accordance with the present invention, a caller is provided having optimized in-lined functionality when initiating a remote function call between managed and unmanaged object systems. The in-lined functionality includes utilizing direct calls and returns within a calling function. In this manner, pushing additional arguments onto an execution stack because of an external stub reference is reduced. According to another aspect of the present invention, code loops are analyzed to enable stack markers to be "hoisted" and thus pushed a single time instead of each time the calling function executes. Other aspects of the optimized caller provide garbage collection and thread management, security attribute checking on outgoing calls, and calling convention considerations, wherein arguments and return values are organized according to the convention utilized by the remote object system. In-lined marshalling can be included to provide enhanced performance over external stub code references along with code extensibility options wherein, functions can be generalized to insulate respective object systems from implementation details of the called functions.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology to facilitate communications and enhanced processor execution performance between object systems. Although the present invention is described in terms of communications between managed and unmanaged object systems, it is to be appreciated that the concepts, as described herein, can be utilized to include communications between substantially any object system (e.g., managed/unmanaged, managed/managed, unmanaged/unmanaged object systems).

The present invention promotes enhanced computer execution performance via a general performance optimization for interoperation of code that can be under the control of an execution engine, virtual machine and/or other code such as unmanaged code. In order to minimize the execution overhead for the transition between object systems during communications, the present invention includes one or more optimizations within a calling function that facilitates communications between the object systems (e.g., managed to unmanaged code). According to one aspect of the present invention, a plurality of conditions can be controlled which can be statically or dynamically validated at code generation time (e.g., Just-In-Time (JIT) and/or "Pre-JIT"), wherein interface code can be in-lined into a caller in order to "speed-up" the overall execution time of a call/return pair across a managed/unmanaged boundary. Several factors can contribute to the speed-up during object system communications. For example, copying (e.g., re-pushing) of outgoing call arguments is mitigated and adding a stack marker to an explicit list of stack markers can be hoisted. In cases including multiple calls, for example, adding to the list can be achieved in a single update instead of multiple updates as with conventional systems.

Figure 1:
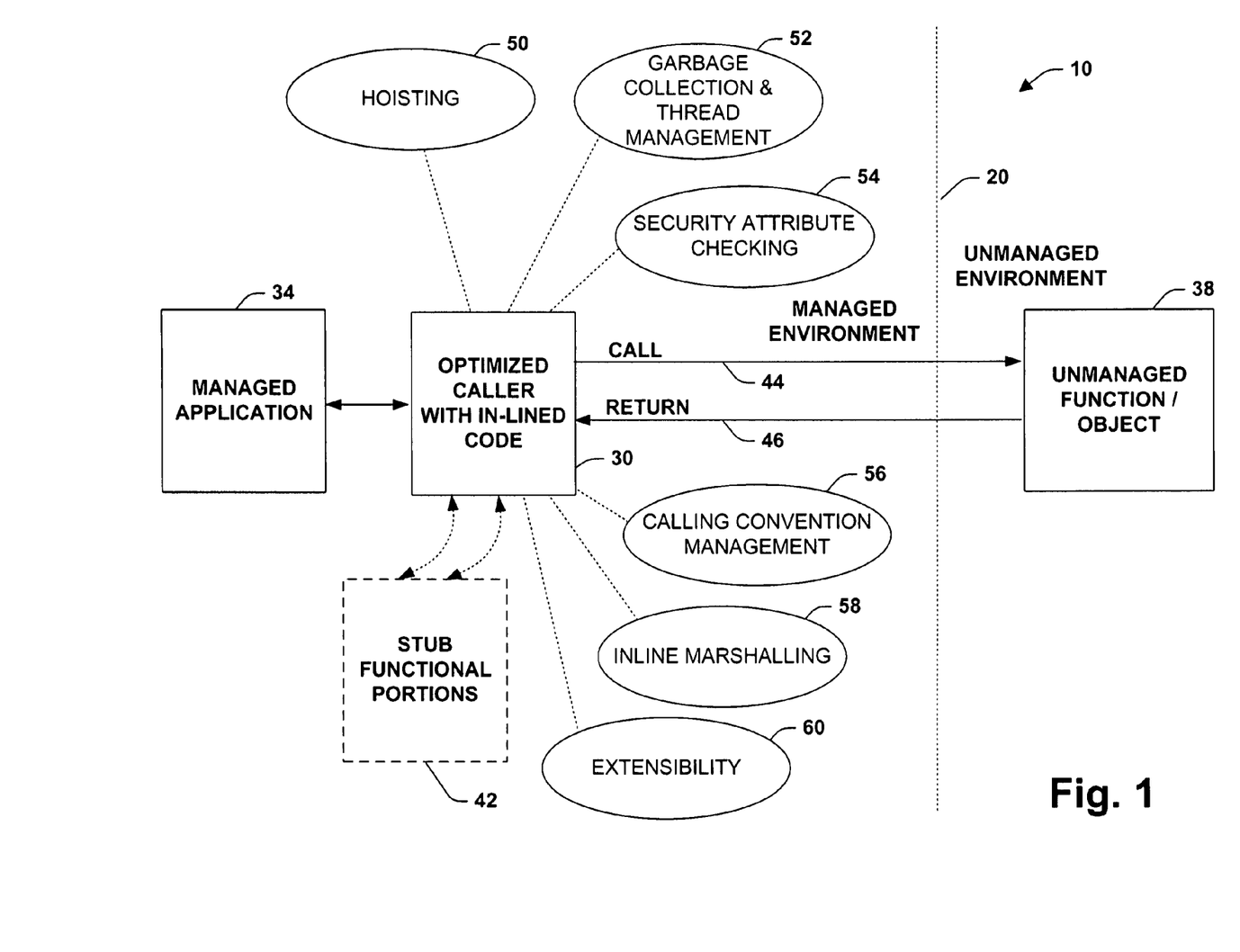
FIG. 1 is a schematic block diagram illustrating an optimized caller with in-lined code in accordance with an aspect of the present invention.

Referring initially to FIG. 1, a system 10 illustrates communications between object systems in accordance with an aspect of the present invention. A boundary line 20 depicts a separation between a managed and unmanaged operating environment, wherein an optimized caller 30 is provided to facilitate communications between a managed application 34 and an unmanaged function and/or object 38. It is noted that one or more callers (not shown) can be included within the managed application 34 and are invoked when methods and/or function calls are initiated from the managed application 34, wherein respective methods and/or function calls can be associated with a caller other than the caller 30. The caller 30 incorporates stub functional portions 42 (illustrated for explanatory purposes only) within the caller 30 to improve code execution performance in accordance with the present invention.

As illustrated, the caller 30 utilizes a direct call/return pair 44 and 46 to interact and communicate with the unmanaged object 38 rather than invoke an external stub (not shown) as with conventional systems. In this manner, stack operations such as pushing and popping arguments and return values related to the external stub are reduced thus conserving processor execution cycles. In accordance with another aspect of the present invention, a hoisting operation 50 can be provided that further mitigates code execution cycles. As will be described in more detail below, the hoisting operation 50 involves locating a stack marker (not shown) that is utilized for the return 46 from the unmanaged object 38. This is an optimization, wherein the stack marker is located outside of a code loop and placed a single time onto a return list, for example, rather than being placed/located each time the caller 30 executes as with conventional systems.

Due to the hoisting operation 50, several issues involving timing and synchronization of the call/return pair 44 and 46 between the managed and unmanaged environment are considered and accounted for that are generally not required of conventional systems. As will be described in more detail below, this can include providing one or more synchronization flags within the caller 30 to facilitate the hoisting operation 50. This can also include providing garbage collection and/or thread management code 52 to further account for these issues.

Other aspects of the present invention can include providing in-lined security attribute checking 54 within the caller 30, wherein permissions can be verified as to whether the caller 30 can invoke the unmanaged object 38. A calling convention management aspect 56 can also be provided that enables the caller 30 to organize call and return arguments according to the convention utilized by the unmanaged object 38. Another aspect includes optional inline marshalling 58 within the caller 30. This can include incorporation of data marshalling code within the caller 30 depending on desired system performance requirements. Still yet another aspect of the present invention includes providing extensibility 60 to the caller 30. As will be described in more detail below, this can include generalizing functional calls to the unmanaged object 38 such that implementation details within the calls are insulated from the caller 30 and the unmanaged object 38.

FIGS. 2 through 8 illustrate one or more methodologies (FIGS. 2, 3, 4, 5 and 8 also have respective system/other diagrams) to facilitate communications between object systems in accordance with the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 2:
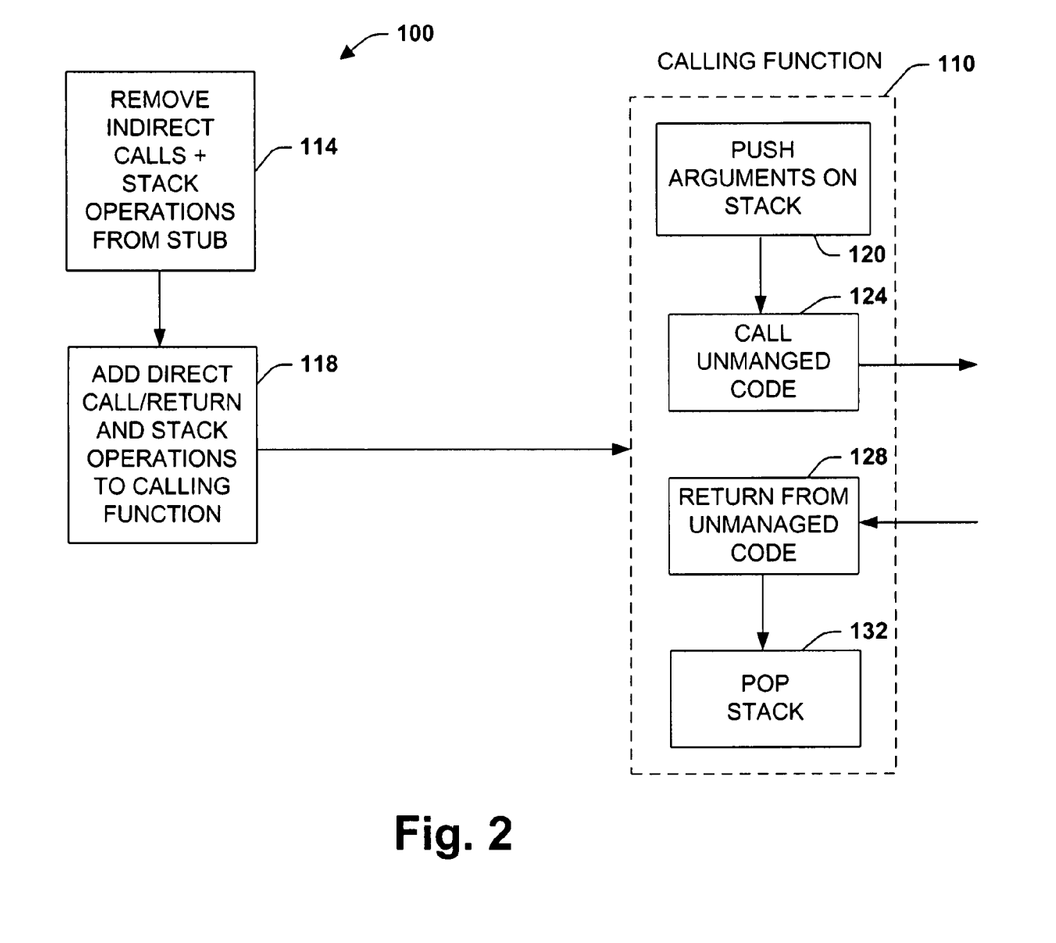
FIG. 2 is a diagram illustrating direct call and return functionality in accordance with an aspect of the present invention.

Referring now to FIG. 2, a flow diagram 100 and calling function 110 illustrate direct call and return functionality in accordance with an aspect of the present invention. At 114, indirect calls and stacking operations that were formerly directed to an external stub are removed from a calling function. At 118, direct call, return and stack operations are incorporated within a calling function 110, wherein the calling function 110 can call and manage returns from unmanaged code directly without invoking an external stub interface, for example. This improves code execution efficiency over conventional systems, wherein argument pushing and popping operations occurred for both the indirect call to the external stub but, also for the external stub interface operations to unmanaged code.

The calling function 110, illustrates the direct call and return management aspects of the present invention. At 120, arguments associated with the calling function are pushed onto an execution stack (not shown). These arguments, (e.g., pointers, variables) can include variable and other parameters that are utilized by the managed system and the remote object/function during execution/return of the call. At 124, a call is directed to the unmanaged code from the calling function 110. After the unmanaged code executes the remote call, a return is initiated by the unmanaged code and is illustrated at 128. At 132, return arguments provided from the unmanaged code at 124 are popped from the stack to complete the call. This may also include popping a stack marker to direct the calling function 110 back within the managed code from which the call originated.

Figure 3:
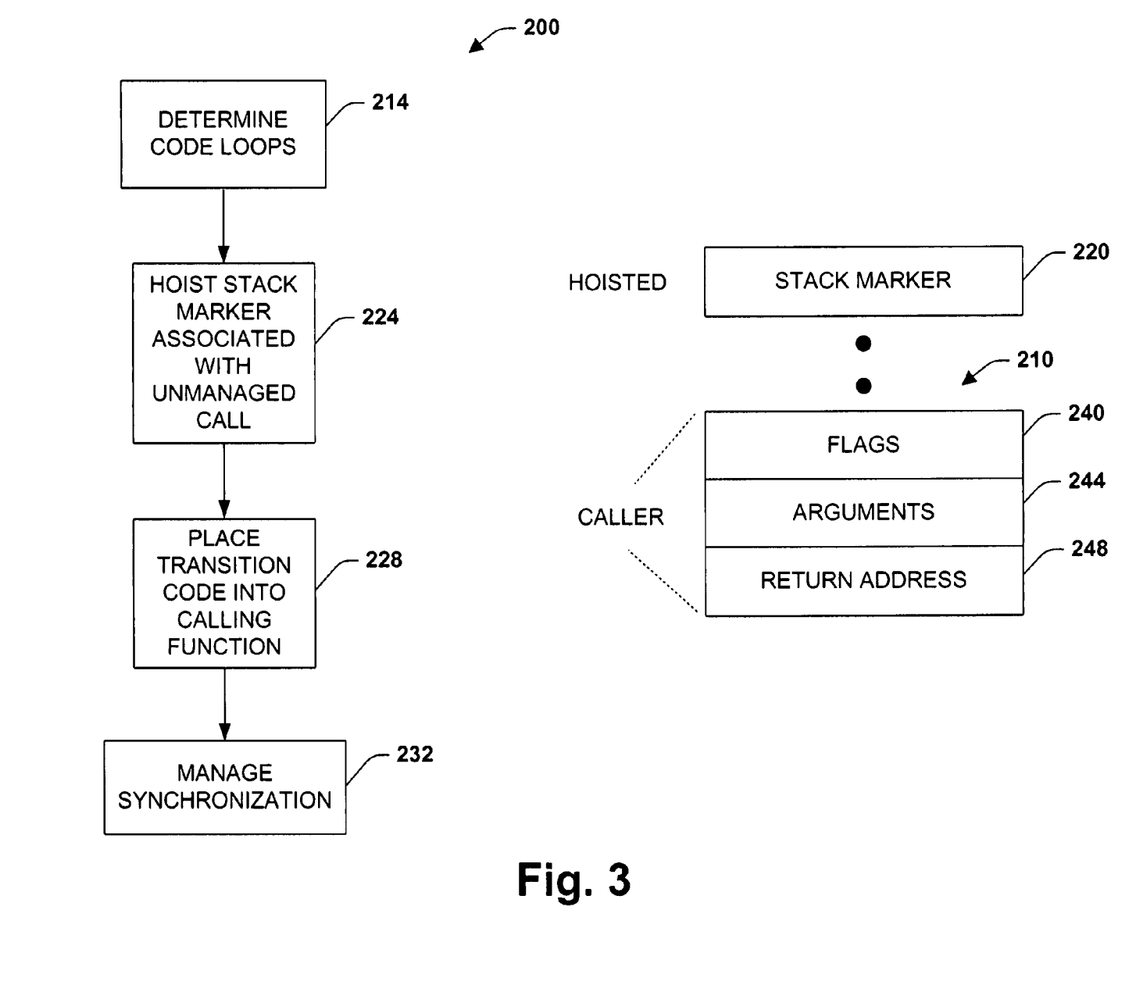
FIG. 3 is a diagram illustrating hoisting and synchronization management in accordance with an aspect of the present invention.

Turning now to FIG. 3, a flow diagram 200 and caller 210 illustrate hoisting and synchronization management in accordance with an aspect of the present invention. At 214, managed code is analyzed (e.g., during compiler optimization routine) to determine where calls originate from such as within a loop or nested loop sequence of code. From this analysis, a stack marker operation such as illustrated at 220, is hoisted or removed at 224 out of the loop and placed in operable association with the caller 210 (e.g., placed at a lower or higher stack address relative to the caller 210). In this manner, the stack marker and related operation 220 can occur a single time per the caller 210 as opposed to each time the caller executes within a loop. As can be appreciated, this also conserves processor and code execution cycles.

Due to the hoisting operation at 224, other issues relating to synchronization and timing of a call/return pair between managed and unmanaged code are considered. For example, when the stack marker 220 is hoisted at 224, there is no longer substantial certainty that execution has transitioned from the managed environment to the unmanaged environment. This is a concern for such issues as operating with a managed garbage collector during unmanaged call execution, for example, and is described in more detail below. Thus, at 228, transition code is added to the calling function to manage synchronization at 232 between the execution of the caller 210, and a system manager such as a garbage collector that is concerned with the lifetime of the caller 210 and the area of memory in which the caller 210 exists. Therefore, one or more flags 240 are associated with the caller 210 to enable synchronization management between object systems during code execution transitions. This can include timing and consideration of such conditions (e.g., race conditions) that can occur between setting the one or more flags 240 indicating a transition from managed execution to unmanaged execution and vice versa and the actual transition that may occur at a different point in time. Other considerations involve the timing of the garbage collector and thread execution upon calls and returns between managed and unmanaged code. Also depicted with the caller 210 are related arguments and return addresses 248.

Figure 4:
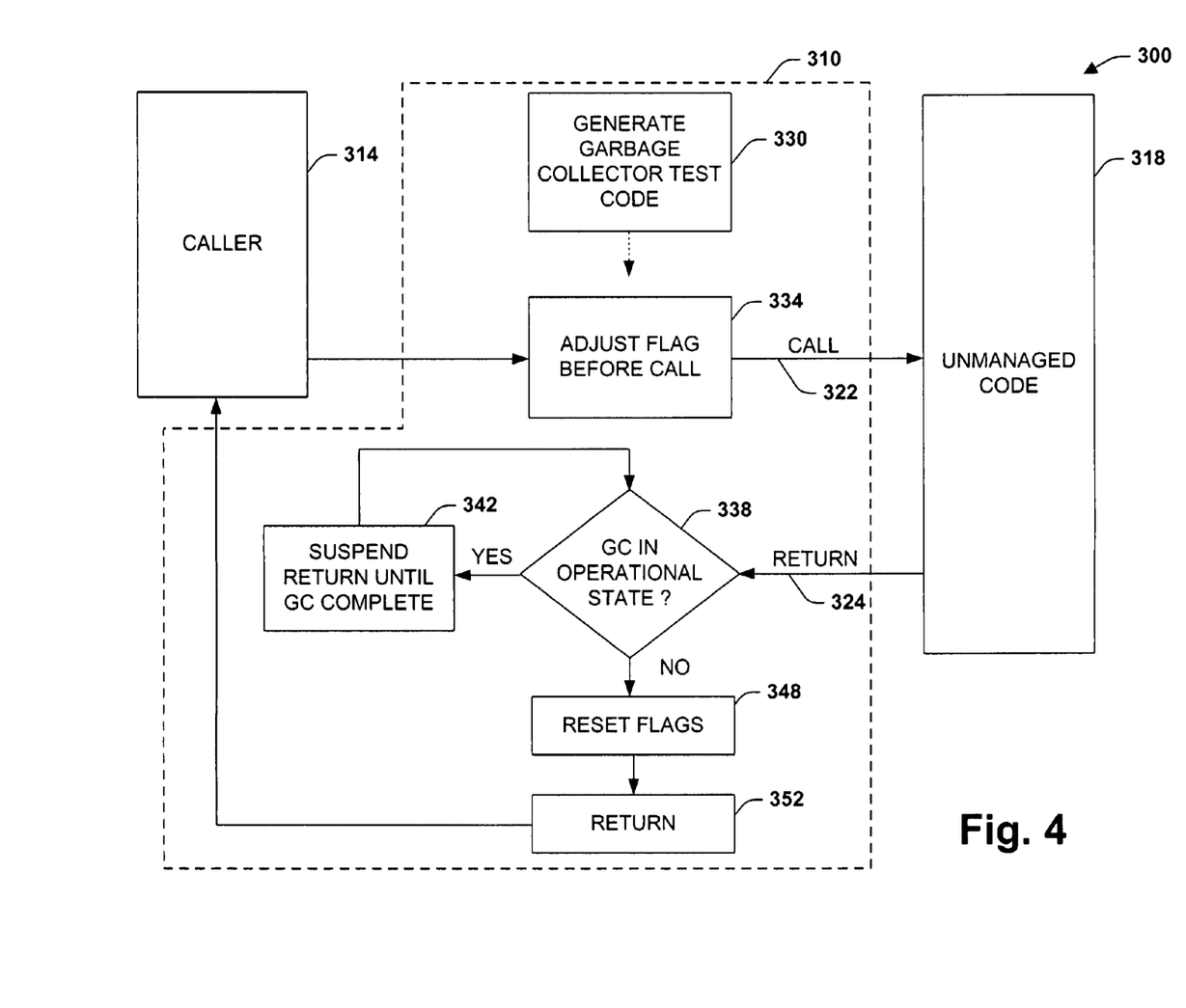
FIG. 4 is a diagram illustrating garbage collection and thread management in accordance with an aspect of the present invention.

Referring now to FIG. 4, a system 300 and flow diagram 310 illustrate garbage collection and thread management in accordance with an aspect of the present invention. The system 300 includes a caller 314 and unmanaged code 318 for executing calls 322 and returns 324 in accordance with the present invention. Proceeding to the flow diagram 310, garbage collector test code is generated at 330 that can include the acts illustrated in 310. Thus, functionality is incorporated into the caller 314 that provide operative instructions to interact with the garbage collector. This includes considerations such as whether the garbage collector (not shown) is just about to execute or is currently executing since caller execution threads associated with the caller 314 can be suspended during garbage collector operations. For example, a global flag can be adjusted and/or periodically updated in the background (e.g., set/reset) relating to the state of the garbage collector before and/or during the call 322. Upon the return 324 from the unmanaged code 318, a determination is made at 338 concerning the current state of the garbage collector. If the garbage collector is operating at 338, (e.g., determined from flag provided at 334 or other indication) the process proceeds to 342 wherein return operations are suspended until the garbage collector has completed activities. If the garbage collector has completed operations at 338, the process proceeds to 348 and resets flags associated therewith and then proceeds to return arguments at 352 to the caller 314.

Figure 5:
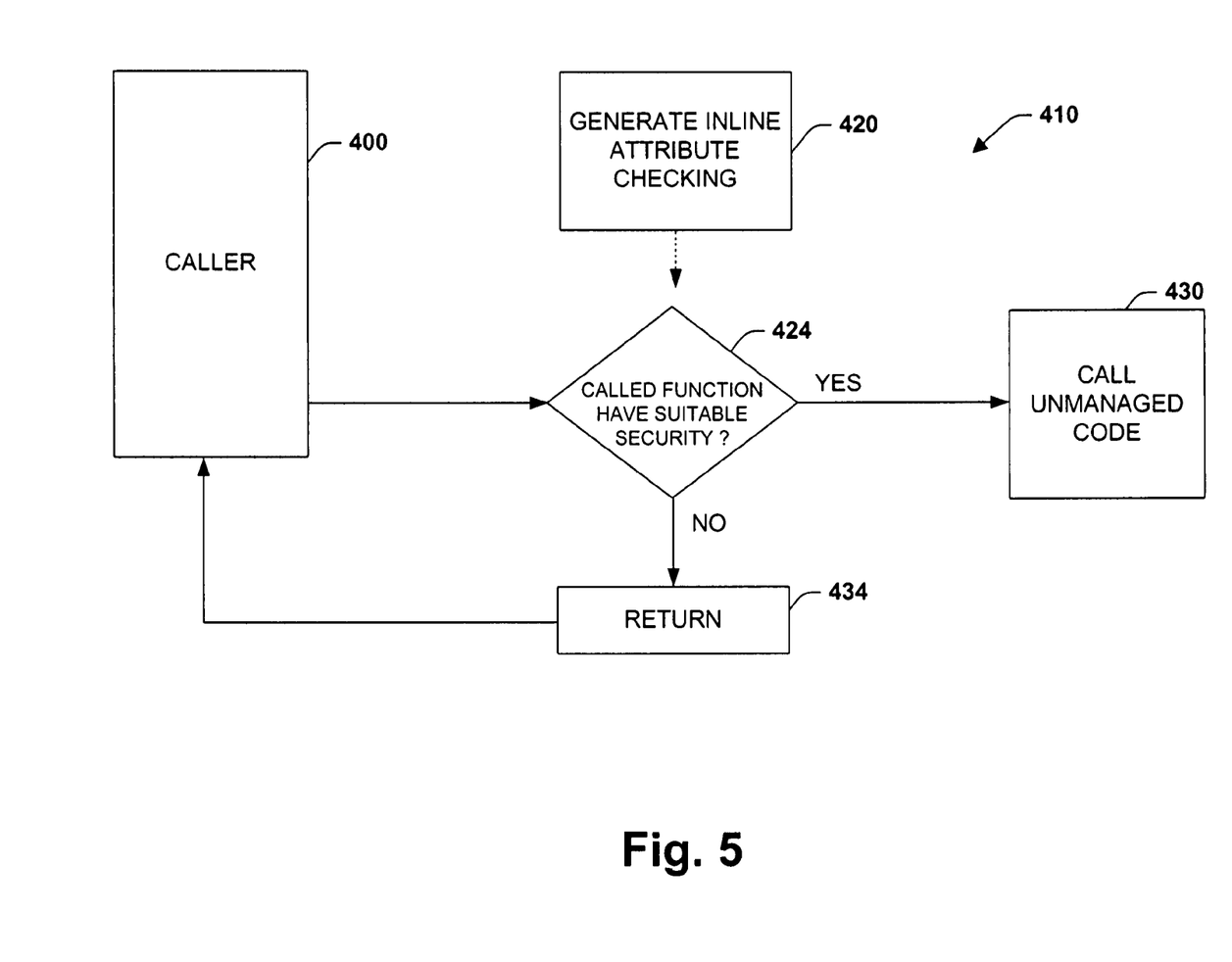
FIG. 5 is a diagram illustrating in-lined security attribute checking in accordance with an aspect of the present invention.

Referring now to FIG. 5, a caller 400 and flow diagram 410 illustrate inline security attribute checking in accordance with an aspect of the present invention. Proceeding to the flow diagram 410, inline security code is generated at 420 that can include the acts illustrated in 410. This can involve providing code that determines security rights and/or other policies between the caller 400 and the unmanaged code (not shown). For example, attributes can be provided that are associated with the unmanaged code that determine whether or not the caller 400 can access and/or utilize the unmanaged code. Providing this type of checking inline with the caller 400 enables an optimization, wherein the managed and unmanaged environments are insulated from the management details of the other environments execution restrictions. At 424, for example, a determination is made as to whether a called function has suitable security rights to enable remote execution from the caller 400. This can include checking/comparing security attributes (e.g., passed as a stack argument, provided in a global file) associated with the unmanaged code. If the security attributes are in agreement with the caller at 424, the process proceeds to 430, wherein the call is then executed with the unmanaged code. If the security attributes are not in agreement at 424, the call can be returned at 434 as an exception (e.g., error flag/code/interrupt), for example, to the caller 400.

Figure 6:
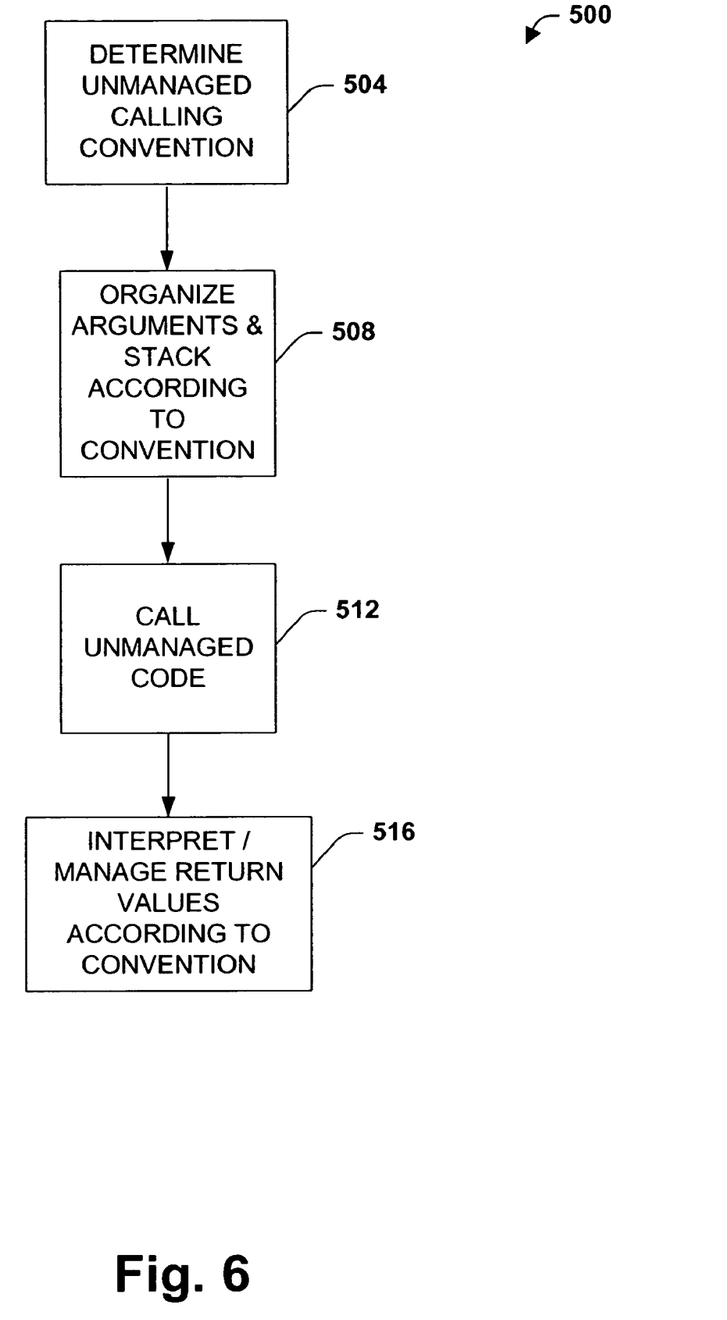
FIG. 6 is a flow diagram illustrating calling convention management in accordance with an aspect of the present invention.

Referring to FIG. 6, a methodology 500 illustrates calling convention management in accordance with an aspect of the present invention. As one or more of the aspects previously described (e.g., callers, management code) can be invoked/constructed with a code generator such as a Just-In-Time (JIT) or Pre-JIT compiler at run time, the nature and orderings of the remote calling conventions employed by the unmanaged code are considered. For example, at 504, these conventions are determined according to the specifications of the unmanaged code and/or remote object system. This can include organizing and/or aligning arguments and the stack, for example, according to the format and structure (e.g., ordering of execution stack, variable structure, argument ordering) expected by the remote object system at 508. At 512, a call is directed to unmanaged code after organizing and providing arguments according to the unmanaged convention or format. At 516, return values are interpreted and managed by the caller according to the calling convention determined at 504.

Figure 7:
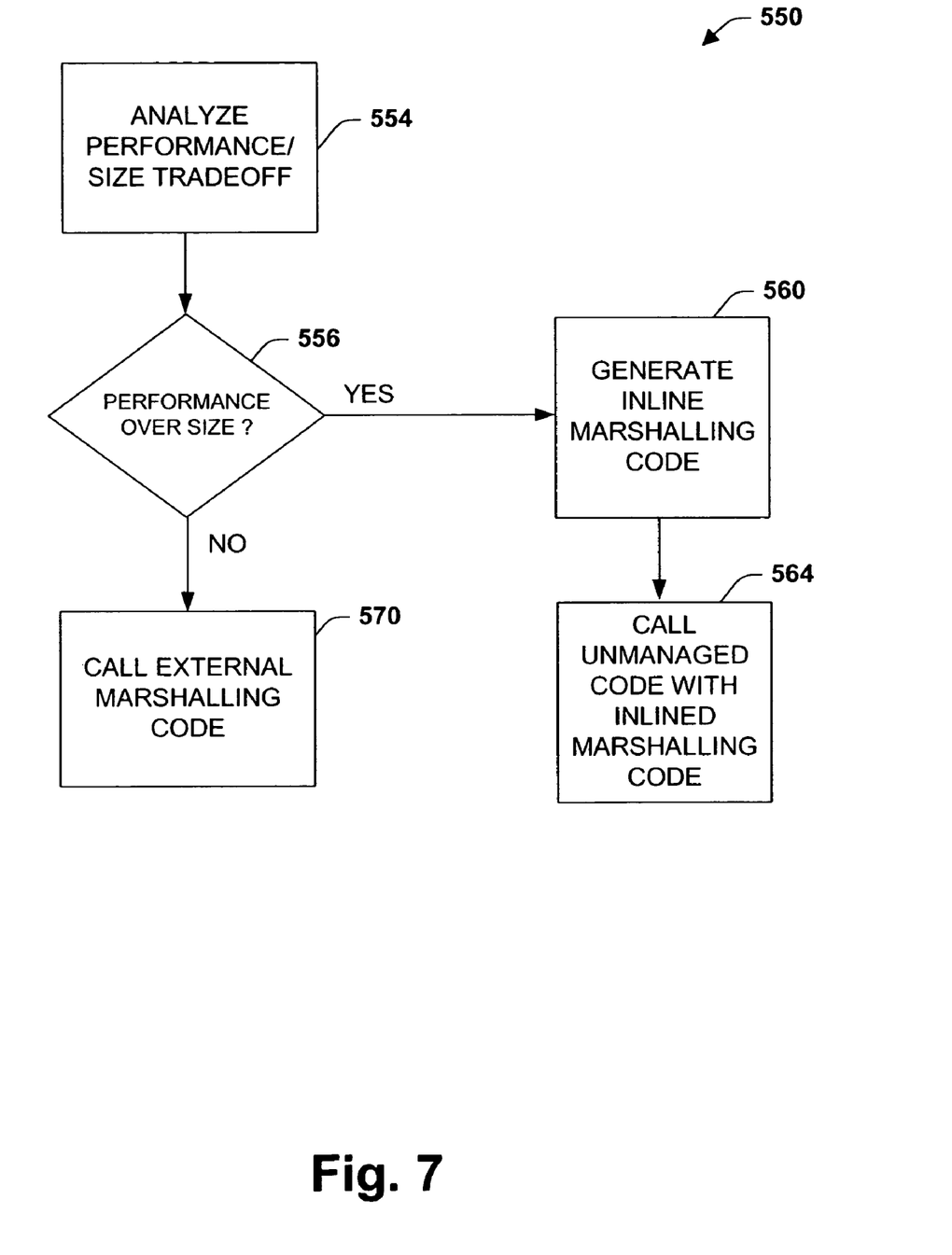
FIG. 7 is a flow diagram illustrating in-lined marshalling in accordance with an aspect of the present invention.

Referring now to FIG. 7, a flow diagram 550 illustrates an aspect of inline marshalling in accordance with an aspect of the present invention. This includes performing a tradeoff analysis between execution performance and code size. For example, marshalling code can cause a substantial amount of code to be generated inline with a caller (not shown). However, call execution performance can be improved by providing in-lined marshalling code as opposed to calling an external function to provide data marshalling between the managed and unmanaged environments. Thus, at 554, system performance requirements are considered. If performance aspects outweigh the additional code aspects at 556, the process proceeds to 560 and generates in-lined marshalling code before proceeding with an unmanaged call utilizing the in-lined marshalling code at 564. If the performance aspects do not outweigh the code generation aspects at 556, the process proceeds to 570, wherein external marshalling code is utilized during a call to unmanaged code.

Figure 8:
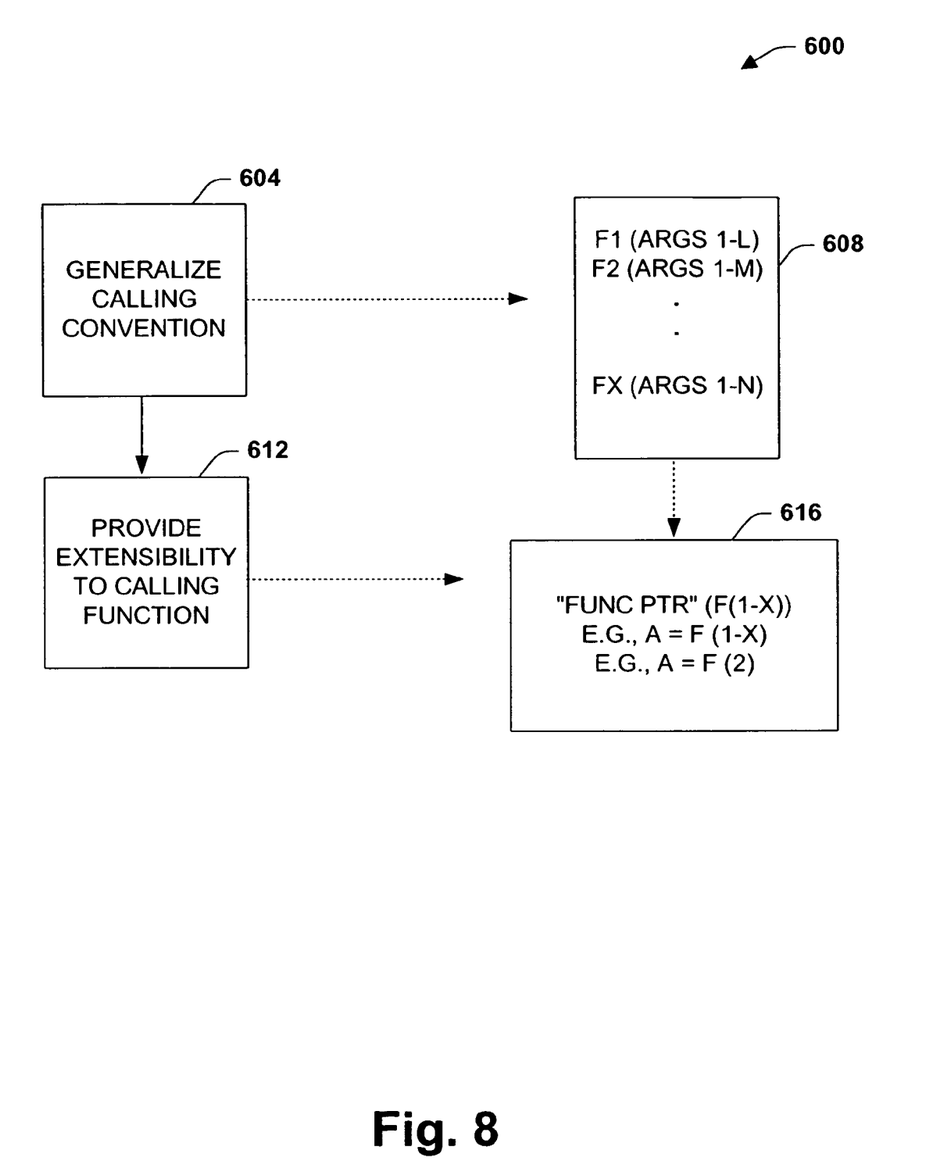
FIG. 8 is a diagram illustrating interface extensibility in accordance with an aspect of the present invention.

Turning to FIG. 8, a diagram 600 illustrates interface extensibility in accordance with an aspect of the present invention. This includes generalizing the calling convention between the managed and unmanaged code at 604 to enable the object systems to be insulated from implementation details such as structural differences between the systems (e.g., argument signatures, variable details, code differences). An exemplary calling convention is illustrated at 608, wherein, unmanaged Functions 1 though X are provided, the functions including arguments 1 though L, 1 through M, and 1 through N, respectively, X, L, M, and N being integers. At 612, extensibility is provided to the calling function. This is illustrated at 616, wherein a "function pointer" is declared for example, passing as an argument the desired unmanaged function to execute. As an example, if a calling function "A" were coded to execute an unmanaged function (2), or any function number having an unmanaged corollary, the code can appear as "A= func_ptr (F(2, args)" thus, enabling the caller to call substantially any function having the proposed format illustrated at 616, without regard for the actual implementation code of the remote and/or unmanaged code.

Figure 9:
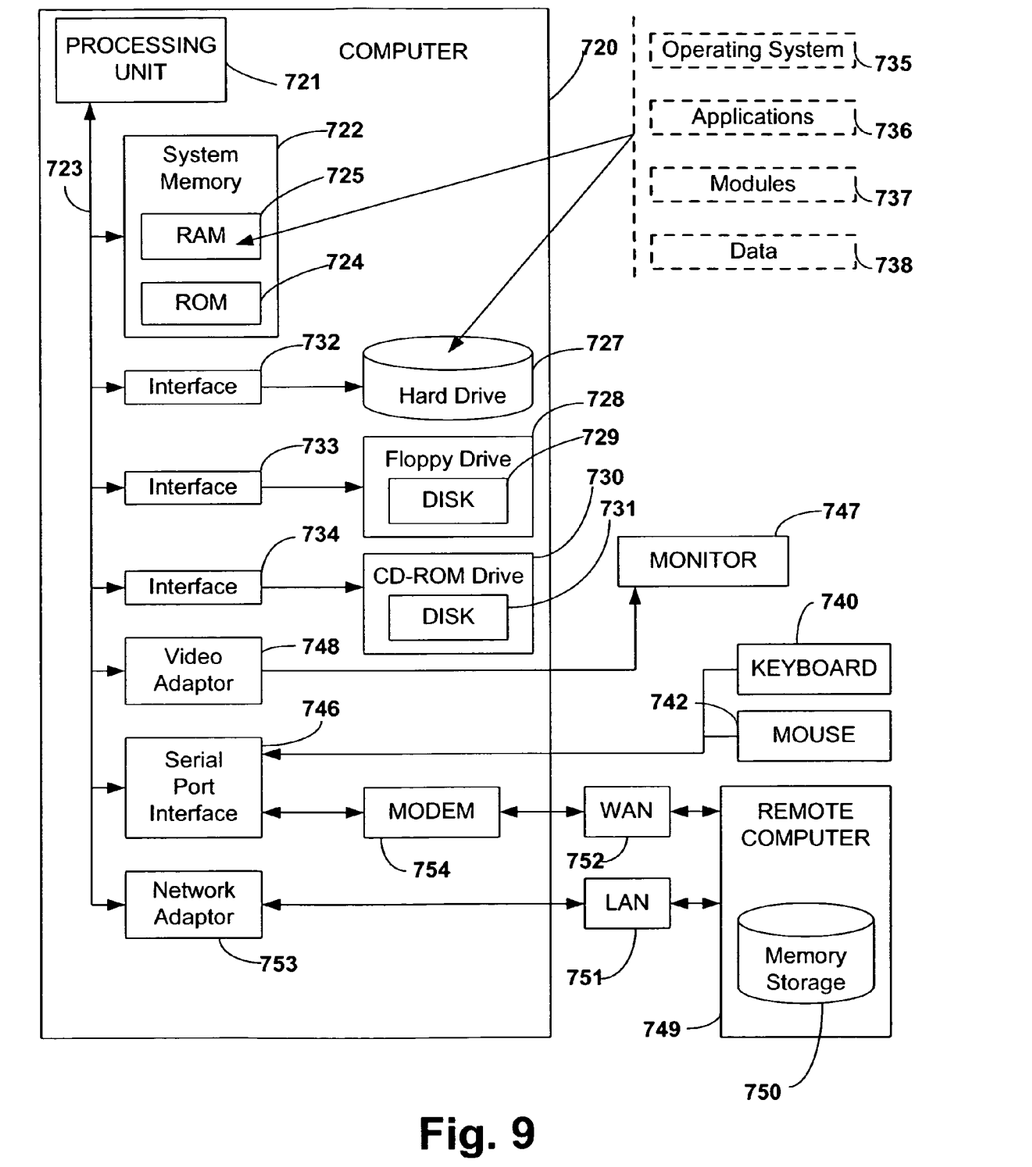
FIG. 9 is a schematic block diagram illustrating a suitable operating environment in accordance with an aspect of the present invention.

In order to provide a context for the various aspects of the invention, FIG. 9 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary system for implementing the various aspects of the invention includes a computer 720, including a processing unit 721, a system memory 722, and a system bus 723 that couples various system components including the system memory to the processing unit 721. The processing unit 721 may be any of various commercially available processors. It is to be appreciated that dual microprocessors and other multi-processor architectures also may be employed as the processing unit 721.

The system bus may be any of several types of bus structure including a memory bus or memory controller, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 725, including an operating system 735, one or more application programs 736, other program modules 737, and program data 738. It is noted that the operating system 735 in the illustrated computer may be substantially any suitable operating system.

A user may enter commands and information into the computer 720 through a keyboard 740 and a pointing device, such as a mouse 742. Other input devices (not shown) may include a microphone, a joystick, a game pad, a satellite dish, a scanner, or the like. These and other input devices are often connected to the processing unit 721 through a serial port interface 746 that is coupled to the system bus, but may be connected by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as a remote computer 749. The remote computer 749 may be a workstation, a server computer, a router, a peer device or other common network node, and typically includes many or all of the elements described relative to the computer 720, although only a memory storage device 750 is illustrated in FIG. 9. The logical connections depicted in FIG. 9 may include a local area network (LAN) 751 and a wide area network (WAN) 752. Such networking environments are commonplace in offices, enterprise-wide computer networks, Intranets and the Internet.

When employed in a LAN networking environment, the computer 720 may be connected to the local network 751 through a network interface or adapter 753. When utilized in a WAN networking environment, the computer 720 generally may include a modem 754, and/or is connected to a communications server on the LAN, and/or has other means for establishing communications over the wide area network 752, such as the Internet. The modem 754, which may be internal or external, may be connected to the system bus 723 via the serial port interface 746. In a networked environment, program modules depicted relative to the computer 720, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 729, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system that facilitates communicating between managed and unmanaged code, comprising:
   a first component that is managed code; and
   a caller associated with the first component, the caller invokes an object related to a second component, the second component being unmanaged code, the caller's code includes an in-lined stub that facilitates communications to and execution management of the object.

2. The system of claim 1, the in-lined stub including a call and return pair that facilitate the communications and execution management of the object.

3. The system of claim 1, further comprising a stack marker that is hoisted from within a code loop associated with the caller that facilitates code execution performance during communications with the object.

4. The system of claim 1, the caller further comprising transition code that synchronizes execution between the objects.

5. The system of claim 1, the caller further comprising one or more flags that synchronize execution of the object.

6. The system of claim 5, the one or more flags utilized to synchronize code execution with a garbage collector.

7. The system of claim 6, the one or more flags suspend return operations from the unmanaged code until operations associated with the garbage collector have completed.

8. The system of claim 1, the caller further comprising security attribute code that insulates the unmanaged code from at least one of code and security implementation details.

9. The system of claim 1, the caller further comprising calling convention code to at least one of organize arguments and an execution stack according to the convention of the unmanaged code.

10. The system of claim 9, the calling convention code utilized to interpret one or more return values from the unmanaged code.

11. The system of claim 1, the caller including at least one of an in-lined marshalling code and an external marshalling code that transfers data between the managed and the unmanaged code.

12. The system of claim 1, the caller further comprising an extensibility component that facilitates generalized communications between the managed and the unmanaged code.

13. The system of claim 12, the extensibility component including a function pointer that includes one or more functions as arguments.

14. A method of facilitating communications between managed and unmanaged code, comprising:
   incorporating external stub code functionality in-line within code of a calling function, the external stub code functionality includes communication and execution management functions between managed and unmanaged code; and
   providing a call and return within the calling code that facilitates the communication and management functions between the managed and unmanaged code.

15. The method of claim 14, further comprising hoisting a marker from a loop associated with the caller to facilitate code execution performance during communications between the managed and unmanaged code.

16. The method of claim 14, further comprising synchronizing execution between the managed and unmanaged code.

17. The method of claim 16, further comprising synchronizing code execution with a garbage collector.

18. The method of claim 17, further comprising suspending operations from the unmanaged code until operations associated with the garbage collector have completed.

19. The method of claim 14, further comprising utilizing security attributes that insulate the managed and unmanaged code from at least one of code and security implementation details.

20. The method of claim 14, further comprising at least one of organizing arguments and an execution stack according to the format of the unmanaged code.

21. The method of claim 14, transferring data between the managed and unmanaged code via at least one of an in-lined marshalling code and an external marshalling code.

22. The method of claim 14, further comprising generalizing a function that facilitates communications between the managed and unmanaged code.

23. The method of claim 22, further comprising utilizing a function pointer that points to one or more functions as arguments that facilitate communications between the managed and unmanaged code.

24. A computer-readable medium having computer-executable instructions for performing the acts of claim 14.

25. A system that facilitates communications between disparate objects, comprising:
    means for incorporating external stub code functionality within code of a caller, the external stub code functionality includes communication and execution management functions between the disparate objects; and
    means for interfacing with the caller to facilitate the communications and management functions between the disparate objects.

26. The system of claim 25, further comprising means for hoisting a marker from a loop associated with the caller to facilitate code execution performance during communications between the disparate objects.

27. A computer-readable medium having stored thereon, a caller that incorporates an in-lined stub that executes and manages a remote object, comprising:
    a first in-lined data set providing call and return interface capabilities within the caller;
    a second in-lined data set providing execution stack instructions for the caller; and
    a third in-lined data set providing hoisting capabilities within the caller, the interface, the stack instructions and the hoisting capabilities enabling the execution of the remote object.

28. A computer-implemented control system that facilitates communication between managed and unmanaged code, comprising:
    a control signal that communicates data between the managed and unmanaged code; and
    a caller associated with the managed code, the caller invokes an object related to the unmanaged code via the control signal, the caller's code includes an in-lined stub that facilitates communications and execution management between the managed and the unmanaged code.

29. A system that facilitates communication, the system comprising:
    a caller component that is associated to a first component, the first component being managed code;
    a second component that is invoked by an in-lined stub within the caller component, the second component is unmanaged code, the in-lined stub facilitates communication and execution management between the components.

30. The system of claim 29, the in-lined stub having a call and return pair that facilitates the communication.

31. The system of claim 29, further comprising a code loop associated with the caller that hoists a stack marker that facilitates code execution performance during the communication.

32. A method of facilitating communications between managed and unmanaged code, the method comprising:
    embedding an in-lined stub code within code of a calling function, the in-lined stub code includes communication and execution management functionality between the managed and unmanaged code; and
    incorporating a call and return within the calling code to facilitate the communications and execution management functionality between the managed and unmanaged code.

33. The method of claim 32, further comprising hoisting a marker from a loop, the marker facilitates code execution performance during communications between managed and unmanaged code.

34. The method of claim 32, further comprising synchronizing execution between the managed and unmanaged code.

35. The method of claim 32, further comprising transmitting data between the managed and unmanaged code via at least one of an in-lined marshalling code and an external marshalling code.

36. A system that facilitates communications between disparate objects, the system comprising:
    means for incorporating an in-lined stub within code of a caller, the in-lined stub includes communication and execution management functionality; and
    means for providing a call and return within the caller that facilitates the communication and execution management functionality between the disparate objects.

37. The system of claim 36, further comprising means for hoisting a marker from a loop associated with the caller to facilitate execution performance during communications between the disparate objects.

38. The system of claim 36, further comprising means for synchronizing execution between the disparate objects.

39. The system of claim 36, further comprising means for insulating the disparate objects from at least one of code and security implementation details.

40. The system of claim 36, further comprising means for suspending return operations from one of the disparate objects associated with unmanaged code until operations associated with a garbage collector have completed.

* * * * *